United States Patent Office 3,346,649
Patented Oct. 10, 1967

3,346,649
SELECTIVE PARTIAL DEALKYLATION OF
TERTIARY ALKYLATED PHENOLS
Gerd Leston, Pittsburgh, Pa., assignor to Koppers
Company, Inc., a corporation of Delaware
No Drawing. Filed Feb. 15, 1966, Ser. No. 527,489
9 Claims. (Cl. 260—624)

ABSTRACT OF THE DISCLOSURE

A method is provided for the selective partial dealkylation of 4,6-di-t-alkyl-3-lower alkyl phenols by heating at an elevated temperature, a 4,6-di-t-alkyl-3-lower alkyl phenol in the presence of a catalytic amount of an aryloxide of a metal selected from zirconium, hafnium, niobium, and tantalum until about 0.2–1.5 moles of isoolefin per mole of 4,6-di-t-alkyl-3-lower alkyl phenol are evolved. The method provides selective partial dealkylation whereby there is obtained as a major reaction product, a 4-t-alkyl-3-lower alkyl phenol; the ratio of 4-isomer to 6-isomer in the product being as high as 2.5–6.0:1. The 4-t-alkyl isomeric products are especially useful; for example, 4-t-butyl-m-cresol can be used in the synthesis of the useful antiseptic thymol or, when added in relatively small amounts, it is useful as an antioxidant for motor fuels, lubricating oils, and greases, turbine oils, solvents, waxes, and the like.

---

This invention relates to the dealkylation of tertiary alkylated phenols. In one specific aspect, it relates to the partial dealkylation of 4,6-di-tertiary alkylated 3-alkylphenols. In another aspect, it relates to the preparation of 4-monotertiary alkylated 3-alkylphenols from 4,6-di-tertiary alkylated 3-alkylphenols. This application is a continuation-in-part of my copending application Ser. No. 301,919 filed Aug. 13, 1963, now abandonded.

Dealkylation of the di-tertiary alkylphenols can be accomplished either thermally or with the aid of a catalyst. Thermal dealkylation was found to be inefficient and workers in the art restored to catalytic dealkylation using relatively strong acid-acting catalysts, such as sulfuric acid, aluminum chloride, aluminum chloride-organic adducts, tetraphosphoric acid, and the like, for liquid phase dealkylation, and silica, alumina, silica-alumina and active clays for vapor phase dealkylation.

Liquid phase dealkylation has generally been preferred to vapor phase dealkylation, since the latter requires high temperatures in the range of 350–550° C., expensive equipment, and regeneration facilities to reactivate the catalyst, which becomes inactive as a result of carbonaceous deposits formed on its surface during the reaction.

Among the liquid phase catalysts, sulfuric acid is most commonly used, since it is the least expensive and is readily commercially available. Unfortunately, there are numerous drawbacks to the use of sulfuric acid as a dealkylation catalyst. Because of its strength, sulfuric acid tends to cause polymerization of the olefin liberated during the dealkylation reaction and certain other undesirable side reactions. Furthermore, sulfuric acid and other strong acid catalysts produce extensive corrosion of the metal parts of the equipment in which the dealkylation is carried out.

In connection with the dealkylation of t-alkylated meta-cresols, sulfuric acid and other strong acid catalyst have an additional limitation. With these catalysts, the partial dealkylation of a material such as 4,6-di-t-butyl-m-cresol results uniformly in the formation of 6-t-butyl-m-cresol and m-cresol as products. It is thus not possible using these strong catalysts, under ordinary conditions to prepare by partial dealkylation the para-mono-t-alkylated meta-cresols, such as 4-t-butyl-m-cresol, since the partial dealkylation results exclusively in the formation of the ortho-isomer. 4-t-butyl-m-cresol is of particular interest, since it, unlike the orthoisomer, can be used in the synthesis of the useful antiseptic, thymol, 4-t-butyl-meta-cresol is also useful, when added in relatively small amounts, as an antioxidant for motor fuels, lubricating oils and greases, turbine oils, solvents, waxes, and the like. It can be prepared directly by the alkylation of meta-cresol with sulfuric acid under extremely mild alkylating conditions as described in Stevens et al., U.S. 2,560,666. Unfortunately, the Stevens et al., process provides only low yields of this interesting product along with much larger amounts of other alkylated materials, such as t-butyl m-tolyl ether.

In my patent, U.S. 3,091,646, there is disclosed and claimed a process where o,p-di-t-alkyl-meta-cresols are dealkylated by heating an ortho, para-di-t-alkyl-meta-cresol in the presence of a catalytic amount of an aluminum aryloxide until dealkylation occurs. A meta-cresol from which at least one t-alkyl group has been removed is recovered from the reaction mixture. Dealkylation can be continued until both t-alkyl groups have been removed or, alternatively, it can be controlled, by measuring the amount of isoolefin evolved, to remove only one of the t-alkyl groups from most of the molecules. By the term dealkylation, I mean an operation in which tertiary alkyl groups are split off from the alkylated cresol without removing the methyl group.

Unfortunately, the dealkylation process described in my patent does not provide selective partial dealkylation. Depending upon the conditions of temperature and catalyst concentration, the principal product of partial dealkylation is a more or less random mixture of 4-t-alkyl-meta-cresol and 6-t-alkyl-meta-cresol; the ratio of 4-t-alkyl-meta-cresol to 6-t-alkyl-meta-cresol being, at best 0.84:1. Thus, the maximum ultimate yield of the highly desirable 4-t-allkyl-meta-cresol obtainable by repeated recycle is only 32 percent.

I have discovered a novel dealkylation method by which, quite surprisingly, I can partially dealkylate a 4,6-di-t-alkyl-3-lower alkylphenol to obtain as the major reaction product, 4-t-alkyl-3-lower alkylphenol; the ratio of 4-isomer to 6-isomer being as high as 2.5–6.0:1.

It is, therefore, an object of the present invention to provide a selective partial dealkylation technique which makes it possible to prepare by dealkylation 4-t-alkyl-3-alkylphenols in yields considerably greater than those heretofore obtainable.

In accordance with the invention, 4,6-di-t-alkyl-3-lower alkylphenols are dealkylated by heating a 4,6-di-t-alkyl-3-lower alkylphenol in the presence of a catalytic amount of aryloxide of a metal of the 5th and 6th periods of the Group IV–B and Group V–B metals until dealkylation occurs. A 3-alkylphenol from which at least one t-alkyl group has been removed is recovered from the reaction mixture. The extent of dealkylation is controlled by measuring the amount of isoolefin evolved.

The metals of the 5th and 6th periods of the Group IV–B and Group V–B elements useable in the present invention are zirconium, hafnium, niobium and tantalum. These metals are classified according to their appearance in the Periodic Table of the Elements, E. H. Sargent & Co., S–18806, Catalogue No. 113, 1964.

The starting material for the process of the invention is 4,6-di-t-alkyl-3 - lower alkylphenol, such as 4,6-di-t-butyl-meta-cresol, 4,6-di-t-amyl - meta - cresol, 4,6-di-t-butyl-3-ethylphenol, 4,6-di-t-butyl-3-isopropylphenol, and the like. The lower alkyl group attached to the 3-position of the benzene ring can be normal lower alkyl or secondary lower alkyl, but not tertiary lower alkyl. Thus, by the term "lower alkyl" as used herein, I am referring to normal or secondary lower alkyl groups, such as methyl, ethyl, n-propyl, isopropyl, n-butyl, isobutyl, sec-butyl, and sec-amyl.

The catalyst used in the invention is an aryloxide of a metal of the 5th and 6th periods of the Group IV–B and V–B metals, including the metal full salts and partial salts of phenols, such as phenol, resorcinol, catechol, pyrogallol, phloroglucinol, o, m, and p-cresol, naphthols, bisphenols, biphenols, and the like. Particularly useful are phenoxides; hydroxyphenoxides, such as catecholates and resorcinolates; and lower alkyl phenoxides, such as m-toloxides, p-toloxides, and the like of the aforementioned metals. These catalysts are preferably made by reacting a chloride, hydroxide, or alkoxide, such as on n-butoxide or isopropoxide of the metals of the 5th and 6th periods of Group IV–B and Group V–B elements of the Periodic Table, with a phenol or alkylated phenol. Conveniently, the phenol used in the formation of the aryloxide is that being subjected to dealkylation in the process of the invention or one of those which is obtained as a dealkylation product. Thus, the preferred aryloxide for the dealkylation of a 4,6-di-t-butyl-cresol or 4,6-t-amyl-meta-cresol is the m-toloxide (m-cresoxide) of the aforementioned metals.

The catalyst may be preformed or it may be formed in situ. To preform the catalyst substantially stoichiometric quantities of metal chloride and the desired phenol, e.g. phenol, m-cresol, p-cresol, or various alkylated phenols and cresols, e.g. 2,4-xylenols, are heated together at an elevated temperature of, for example, 60–250° C. As I have noted hereabove, alkoxides or hydroxides can be used in place of the halides to form the metal aryloxides. The preformed catalyst is conveniently prepared in an aromatic solvent, such as toluene, xylene, and the like. The catalyst is formed in situ by adding sufficient quantities of the metal of the 5th and 6th periods of the Group IV–B and Group V–B metals and the phenol to the reaction mixture prior to dealkylation. If the catalyst used is the aryloxide of the phenol to be dealkylated or the aryloxide of one of the products of dealkylation, it is necessary simply to add a sufficient quantity of halide (or other metal compound) to the reaction mixture.

The amount of catalyst used generally ranges between about 0.01 and 5 mole percent, based on the number of moles of the material to be dealkylated, although the preferred amount of catalyst varies to some extent with the conditions of dealkylation. If less than 0.01 mole percent of catalyst is used, dealkylation is quite slow. For economic reasons no advantage is seen in using greater than about 5 mole percent catalyst, although no adverse effects are obtained thereby. Best results are obtained using 0.10 to 2 mole percent catalyst.

The reaction is markedly endothermic. The temperature is ordinarily maintained between about 200° C. and the reflux temperature of the reaction mixture, which, of course, varies with the particular phenol being dealkylated. For dealkylation of most phenols, a reaction temperature of between 200 and 350° C. is suitable. Below about 150° C. dealkylation is very slow and above the reflux temperature it is not possible to operate in the liquid phase without the use of substantial positive pressure and the recovery of the evolved isoolefin is most difficult. For most phenols a temperature of 225–300° C. is desirable.

In the dealkylation of 4,6-di-t-butyl-meta-cresol, the product of partial dealkylation under the controlled conditions of my process comprises a mixture of 4-t-butyl-meta-cresol, 6-t-butyl-meta-cresol, meta-cresol and some 4,6-di-t-butyl-meta-cresol. The ratio of 4-t-butyl-meta-cresol to 6-t-butyl-meta-cresol in the product mixture depends primarily on the temperature conditions and reaction time, and to a lesser extent on the quantity of catalyst.

Astonishingly, I am able, by the process of my invention, to obtain in the product mixture a ratio of 4-t-butyl-meta-cresol to 6-t-butyl-meta-cresol of 2.5–4.5:1 and an ultimate yield by recycle of about 80 percent 4-t-butyl-meta-cresol. This result is in surprising contrast to that obtainable using the process described in my patent U.S. 3,091,646 wherein the best possible ratio of 4-t-butyl-meta-cresol to 6-t-butyl-meta-cresol is 0.84:1 and the best possible ultimate yield is 32 percent. Thus, the process of the present invention is truly a selective ortho-dealkylation in contrast with the random dealkylation of the heretofore-known process.

Dealkylation is most advantageously conducted at atmospheric pressure, although superatmospheric or subatmospheric pressures may be used in some instances. By working at atmospheric pressure, condensation or recovery of the evolved olefin is less difficult and continuous operation is facilitated. Slight positive pressures of e.g. 30–60 p.s.i. are sometimes helpful in that the size of the equipment may be reduced and refrigeration is not required to liquify and separate the evolved olefin. When it is desired to flash off the m-cresol formed during the reaction, reduced pressure can be used, but the recovery of the coproduct isoolefin becomes more difficult under such conditions.

The reaction time can be conveniently determined by measuring the amount of isoolefin removed from the reaction mixture. The reaction is stopped after only a fraction of the t-alkyl groups, i.e. from about 0.2 to 1 mole per mole of reactant, are removed as gaseous olefin. Up to about 1.5 moles of olefin per mole of reactant can be removed, although at ratios of 1.5:1, the ultimate yield of product is decreased.

The dealkylated products can be recovered in a variety of ways. The dealkylated mass can be subjected directly to a fractional distillation by operating under a reduced pressure of e.g. 5–50 mm. of Hg. Solid caustic can be added to the crude reaction mixture and the resulting mass can thereafter be fractionated. Alternatively, a mineral acid can be added to the dealkylated mixture to destroy the catalyst. The aqueous and organic layers thus formed are separated and the products can be recovered by fractionation from the organic layer. Any metal oxide formed during the course of the reaction may be removed from the crude dealkylation mixture by adding water and filtering.

The mixed butylated 3-alkylphenols and meta-cresols can also be separated by extracting the dealkylated mass with dilute sodium hydroxide. In the case of the cresols, 6-t-butyl-metal-cresol and 4,6-di-t-butyl-meta-cresol are insoluble in dilute caustic and, thus, they remain behind as residue. The caustic-soluble materials, meta-cresol and 4-t-butyl-meta-cresol, can be recovered from the extract by neutralizing it with a relatively dilute solution of mineral acid, such as hydrochloric acid. The accepted physical characteristics of the components of the partially dealkylated cresol mixture are shown hereunder in Table I.

TABLE I

| | Soluble in 10% NaOH | Freezing or Melting Point, ° C. | Boiling Point, ° C. 20 mm. |
|---|---|---|---|
| meta-Cresol | Yes | 11.5 | 101 |
| 4-t-butyl-3-methylphenol | Yes | 72–73 | 153 |
| 6-t-butyl-3-methylphenol | No | 23.5 | 129 |
| 3-methyl-4,6-di-t-butylphenol | No | 62.4 | 167 |

The partial dealkylation process of the invention may be made continuous by feeding fresh di-t-alkyl-3-alkylphenol as the dealkylation takes place. In a batch operation, after removal of the product or products, the catalyst may be recycled and used in a subsequent run.

My invention is further illustrated by the following examples:

EXAMPLE I

*Dealkylation of 4,6-di-t-butyl-meta-cresol*

A solution of 110 g. (0.5 mole) of 4,6-di-t-butyl-meta-cresol (F.P. 55° C., 95 percent pure by vapor phase chromatography), and 3.1 g. of zirconium n-butoxide (0.0024 mole) to a 30 percent solution in xylene were heated at reflux (263° C.) with stirring. After 45 minutes, the temperature had dropped to 229° C. with evolution of 0.420 cu. ft. of gas. The reaction mixture at this point was immediately cooled and the weight loss determined; 26 g. isobutylene (0.465 mole). Vapor phase chromatography analysis (area percent) indicated the following: 20.7 percent m-cresol; 13.0 percent 6-t-butyl-meta-cresol; 32.5 percent 4-t-butyl-meta-cresol and 33.7 percent 4,6-di-t-butyl-meta-cresol.

EXAMPLE II

*Dealkylation of 4,6-di-t-butyl-meta-cresol*

The catalyst was preformed by refluxing 55 g. of dried m-cresol and 210 g. of zirconium butoxide (in xylene) under a 12 inch helix-packed column until the n-butanol was apparently removed. The solution remaining contained 41.3 percent m-toloxide by calculation.

A solution of 110 g. (0.5 mole) of 4,6-di-t-butyl-meta-cresol and 3.0 g. of zirconium m-toloxide solution (0.00245 mole) was heated at reflux with stirring (262° C.). After forty minutes, the temperature had dropped to 228° C. with the evolution of 0.420 cu. ft. of gas. The reaction mixture was cooled and the weight loss was determined; 25 g. of isobutylene (0.477 mole). Gas chromatographic analysis (area percent) indicated the following: 19.8 percent m-cresol; 3.8 percent unknown; 12.1 percent 6-t-butyl-meta-cresol; 28.0 percent 4-t-butyl-meta-cresol and 36.3 percent 4,6-di-t-butyl-meta-cresol.

EXAMPLE III

*Dealkylation of 4,6-di-t-butyl-3-meta-cresol*

A solution of 110 g. (0.5 mole) of 4,6-di-t-butyl-meta-cresol and 1.5 g. of 30 percent zirconium butoxide in xylene (0.00125 mole) was heated with stirring as in the previous examples. Reflux temperature was 274° C.; after 1.75 hours, the temperature had dropped to 242° C. with the evolution of 0.419 cu. ft. of gas. The weight loss at this point was 23.1 g. (0.413 mole of isobutylene). Gas chromatographic analysis (area percent) indicated 15.7 percent m-cresol, 4.1 percent unknown, 10.7 percent 6-t-butyl-meta-cresol, 32.2 percent 4-t-butyl-meta-cresol and 37.2 percent 4,6-di-t-butyl-meta-cresol.

EXAMPLE IV

*Dealkylation of 4,6-di-t-butyl-meta-cresol*

This reaction was similar to that presented as Example I except that the amount of catalyst solution was reduced to 0.30 g. Samples were withdrawn at the beginning (Sample 1; 115° C.), after 38 minutes (Sample 2; 283–261° C., 0.135 cu. ft. of gas evolved), after 41 minutes (Sample 3; 283–257° C., 0.210 cu. ft. evolved) and after 61 minutes (Sample 4; 283–245° C., 0.420 cu. ft.).

The samples were analyzed by gas chromatography with the following results:

|  | Sample 1 | Sample 2 | Sample 3 | Sample 4 |
|---|---|---|---|---|
| m-Cresol | | 1.3 | 2.5 | 20.3 |
| 6-t-butyl-m-cresol | 7.5 | 4.0 | 5.0 | 10.0 |
| 4-t-butyl-m-cresol | | 21.6 | 29.8 | 39.9 |
| 4,6-di-t-butyl-m-cresol | 92.5 | 72.4 | 61.9 | 29.2 |
| Para/ortho ratio | | 5.4:1 | 6.0:1 | 4.0:1 |

EXAMPLE V

*Dealkylation of 4,6-di-t-butyl-3-ethylphenol*

A 58.5 gas portion (0.25 mole) of 4,6-di-t-butyl-3-ethylphenol which had been distilled at 173–174° C./20 mm. and recrystallized to give M.P. 80.5° C. was partially debutylated at 229–227° C. by the addition of 0.9 g. m-cresol and 1.0 g. of a 41.3 percent solution of zirconium m-toloxide in xylene. A sample withdrawn after about ten minutes when one-quarter of the t-butyl groups (0.125 mole) had been removed as isobutylene was analyzed by gas chromatography and showed (on a xylene-free basis) 64.5 area percent of starting material, 22.6 percent of 4-t-butyl-3-ethylphenol, 5.5 percent 2-t-butyl-5-ethylphenol, 4.5 percent m-ethylphenol and 1.9 percent m-cresol. Assuming that area percentages correspond to weight percentages, the ratio of para-isomer to ortho-isomer was 4.1:1, the per pass conversion to the para-substituted m-ethylphenol 27.0 percent, and the ultimate yield 65.1 percent.

The debutylation was continued for another twenty minutes at which time one-half of the theoretical amount of isobutylene had been expelled. Gas chromotographic analysis on the reaction product showed 39.7 percent starting material, 32.1 percent 4-t-butyl-3-ethylphenol, 12.7 percent 2-t-butyl-5-ethylphenol and 15.6 percent m-ethylphenol (xylene and m-cresol-free basis). These values correspond to a para/ortho ratio of 2.5:1, a per pass conversion of 32.4 percent and an ultimate yield of 47.5 percent to the desired 4-t-butyl-3-ethylphenol.

The product, 47.2 g., was distilled in a one-foot 10 mm. I.D. 3/32" glass helix-packed column at 20 mm. Hg. All 14 fractions, the hold-up and the hydrochloric acid-washed residue were analyzed by gas chromatography which verified the analysis made on the crude reaction mixture. The purest fraction of 4-t-butyl-3-ethylphenol (ca. 91 percent pure) boiled at 161.5–162.0° C. One recrystallization of this solid gave a white material which melted at 65.5–67.5° C. after drying, and which had an infrared spectrum consistent with its proposed structure when compared to that of the known 4-t-butyl-3-methylphenol. The major portion of the starting material was recovered at 173–174° C.

EXAMPLE VI

*Dealkylation of 4,6-di-t-butyl-3-isopropylphenol*

A mixture of 12.3 g. of 4,6-di-t-butyl-3-isopropylphenol (0.050 mole, M.P. 142.4–143° C.) and 0.30 g. of a 41.3 percent solution of zirconium m-toloxide in xylene was heated to reflux (274° C.). After about one-half hour, the temperature had dropped to 253° C. with the evolution of 0.021 cu. ft. of gas (corresponding to 0.025 mole of isobutylene). Gas chromatographic analysis showed xylene, 0.7 percent (area); m-cresol, 0.5 percent, 3-isopropylphenol, 6.0 percent; 6-t-butyl-3-isopropylphenol, 7.2 percent; 4-t-butyl-3-isopropylphenol, 41.1 percent and 4,6-di-t-butyl-3-isopropylphenol 44.5 percent. These figures correspond to a para/ortho ratio of 5.7:1, a conversion to 4-t-butyl-3-isopropylphenol of 45 percent and an ultimate yield of 72 percent.

Dealkylation was continued for another eighteen minutes during which time another 0.021 cu. ft of gas was evolved while the temperature had remained constant. Duplicate gas chromatographic analysis of the residue showed xylene, 0.5 percent; m-cresol, 0.7 percent; 3-isopropylphenol, 22.6 percent; 6-t-butyl-3-isopropylphenol, 10.2 percent; 4-t-butyl-3-isopropylphenol, 40.2 percent; and 4,6-di-t-butyl-3-isopropylphenol 20.0 percent. These values correspond to a para/ortho ratio of 4.5:1, a conversion to 4-t-butyl-3-isopropylphenol of 45 percent and an ultimate yield of 52 percent.

The residue, 9.10 g., was diluted with benzene and the solution extracted twice with 10 ml. of 10 percent aqueous sodium hydroxide. Acidification left a material whose gas chromatographic analysis indicated 70 percent 4-t-butyl-3-isopropylphenol. Four recrystallizations of a sample from hexane followed by drying gave a white solid, M.P. 97.5–98° C., whose infrared spectrum is consistent with its proposed structure by comparison with that of the known 4-t-butyl-3-methylphenol.

EXAMPLE VII

Dealkylation with niobium catalyst

A solution of 7.6 grams of dry meta-cresol and 0.35 gram of niobium pentachloride was refluxed for 4.5 hours. To the cooled catalyst solution (0.00125 mole of niobium catalyst) was added 55 grams (0.25 mole) of 4,6-di-t-butyl-meta-cresol. The solution was refluxed for three hours (maximum temperature ca. 250° C.). The cooled solution showed a weight loss of 13 grams (0.232 mole of isobutylene). Gas chromatographic analysis showed 23.8% meta-cresol, 10.4% 6-t-butyl-meta-cresol, 35% 4-t-butyl-meta-cresol, and 30.8% 4,6-di-t-butyl-meta-cresol. The ratio of 4-t-butyl-meta-cresol to 6-t-butyl-meta-cresol was 3.37:1.

EXAMPLE VIII

Dealkylation with tantalum catalyst

A solution of 7.0 grams of dry meta-cresol and 0.45 gram of tantalum chloride was refluxed with stirring for 4 hours, to produce 0.00125 mole of tantalum catalyst. The catalyst solution was cooled and 55 grams (0.25 mole) of 4,6-di-t-butyl-meta-cresol was added. The reaction mixture was heated to reflux (242° C.) and refluxed for 40 minutes. On cooling to 229° C., the weight loss was 14.9 grams (0.266 mole of isobutylene). Gas chromatographic analysis indicated 30.8% metal-cresol, 14.0% 6-t-butyl-meta-cresol, 35% 4-t-butyl-meta-cresol and 19.5% 4,6-di-t-butyl-meta-cresol. The para/ortho ratio was 2.5:1.

EXAMPLE IX

Dealkylation with hafnium catalyst

The dealkylation of 4,6-di-t-butyl-meta-cresol was carried out using hafnium toloxide as a catalyst and the reaction conditions of Example VIII. The results were comparable to those of Example VIII, with 4-t-butyl-meta-cresol being the predominant mono-t-butylated isomer.

The surprising results obtainable by the method of the present invention are dramatically illustrated by the following comparative examples where aryloxides of the other Group IV-B and Group V-B metals, titanium, and vanadium, were used as the catalyst.

EXAMPLE X

Titanium catalyst dealkylation

Tetraisopropyl titanate (0.4 mole percent) was added to 4,6-di-t-butyl-meta-cresol and the mixture was refluxed. After 28 hours a sample submitted for infrared analysis showed 16 percent 4-t-butyl-meta-cresol and 44 percent 6-t-butyl-meta-cresol. Additional catalyst was introduced and after a total of 57.5 hours, 70 percent of the theoretical amount of gas evolved. The reaction mixture still contained 14 percent 4-t-butyl-meta-cresol and 44 percent 6-t-butyl-meta-cresol. Thus, titanium aryloxides are not selective dealkylation catalysts, as shown by the ratio of 4-t-butyl-meta-cresol to 6-t-butyl-meta-cresol of only 0.32:1.

EXAMPLE XI

Dealkylation with vanadium m-toloxide

A mixture of 7.0 grams of meta-cresol and 0.2 gram of vanadium trichloride was refluxed with stirring overnight until the evolution of hydrogen chloride and ceased. To the cooled mixture was added 55 grams (0.25 mole) of 4,6-di-t-butyl-meta-cresol and the mixture refluxed 7.5 hours at ca. 250° C. Samples were taken after one hour refluxing (Sample 1) and upon completion (Sample 2).

The percent composition of the samples, analyzed by gas chromatograph anaylsis, follow:

|  | Sample 1 (1 hour zeflux) | Sample 2 (7.5 hrs. reflux) |
| --- | --- | --- |
| meta-Cresol | 13.0 | 13.0 |
| 6-t-butyl-meta-cresol | 1.7 | 3.5 |
| 4-t-butyl-meta-cresol | 0.2 | 3.2 |
| 4,6-di-t-butyl-meta-cresol | 85.0 | 80.2 |

Thus, vanadium aryloxides are not only poor with relation to selectivity of dealkylation but are relatively inactive catalysts for dealkylation as evidenced by the fact that 80% of the 4,6-di-t-butyl-meta-cresol still remained after 7.5 hours reaction time.

I claim:

1. A method of selectively partially dealkylating 4,6-di-t-alkyl-3-lower alkylphenols, comprising heating at a temperature of 200° C. up to reflux temperature a 4,6-di-t-alkyl-3-lower alkylphenol in the presence of a catalytic amount of an aryloxide of a metal selected from the group consisting of the fifth and sixth periods of the Group IV-B and V-B elements of the Periodic Table until about 0.2-1.5 moles of isoolefin per mole of 4,6-di-t-alkyl-3-lower alkylphenol are evolved, the resulting product being a mixture containing mixed mono-t-alkyl-3-lower alkylphenols, wherein the 4-t-alkyl-3-lower alkylphenol is present in an amount greater than the 6-t-alkyl-3-lower alkylphenol.

2. Method according to claim 1 wherein the 4-t-alkyl-3-lower alkylphenol/6-t-alkyl-3-lower alkylphenol weight ratio in the dealkylated product is at least 2.5:1.

3. Method according to claim 1 wherein said elevated temperature is between 200-300° C.

4. Method according to claim 1 wherein said aryloxide is present in an amount of 0.05-5 mole percent, based on the number of moles of 4,6-di-t-alkyl-3-lower alkylphenol.

5. Method of making a 4-t-butyl-3-lower alkylphenol, comprising heating a 4,6-di-t-butyl-3-lower alkylphenol at a temperature of 200° C. up to the reflux temperature of the reaction mixture in the presence of 0.1-2 mole percent, based on the number of moles of 4,6-di-t-butyl-3-lower alkylphenol, of an aryloxide of a metal selected from the group consisting of the 5th and 6th periods of the Group IV-B and V-B elements of the Periodic Table until 0.2-1 mole of isobutylene per mole of 4,6-di-t-butyl-3-lower alkylphenol is evolved, and recovering said 4-t-butyl-3-lower alkylphenol from the reaction mixture.

6. Method according to claim 5 wherein said temperature is between 225-300° C.

7. Method according to claim 5 wherein said 4-t-butyl-3-lower alkylphenol is 4-t-butyl-meta-cresol.

8. Method according to claim 5 wherein said 4-t-butyl-3-lower alkylphenol is 4-t-butyl-3-ethylphenol.

9. Method according to claim 5 wherein said 4-t-butyl-3-lower alkylphenol is 4-t-butyl-3-isoproplyphenol.

References Cited

UNITED STATES PATENTS

| 2,444,545 | 7/1948 | Thomas | 260—672 |
| 3,091,646 | 5/1963 | Leston | 260—624 |
| 3,151,176 | 8/1964 | Flanders | 260—672 |
| 3,197,523 | 7/1965 | Michalko et al. | 260—672 |

LEON ZITVER, *Primary Examiner.*

W. B. LONE, *Assistant Examiner.*